United States Patent [19]
Kucerija

[11] Patent Number: 5,003,782
[45] Date of Patent: Apr. 2, 1991

[54] GAS EXPANDER BASED POWER PLANT SYSTEM

[76] Inventor: Zoran Kucerija, 46 Butternut Dr., Pittsford, N.Y. 14534

[21] Appl. No.: 549,090

[22] Filed: Jul. 6, 1990

[51] Int. Cl.⁵ .......................................... F01K 25/10
[52] U.S. Cl. ................................................ 60/648
[58] Field of Search ........................................ 60/648

[56] References Cited

U.S. PATENT DOCUMENTS

| | | | |
|---|---|---|---|
| 4,328,674 | 5/1982 | Wenzel | 60/648 |
| 4,693,072 | 8/1986 | McLean et al. | 60/39.02 |
| 4,920,749 | 5/1990 | Letarte | 60/648 |

*Primary Examiner*—Allen M. Ostrager

[57] ABSTRACT

A gas expander based power plant system for generating electricity at a pressure reducing station of a gas transmission pipeline is disclosed where gas at high pressure is being delivered to the distribution or gas utilization system; by means of pressure reduction with a gas expander system capable of accommodating fluctuating high pressure gas conditions and maintaining desired lower pressure gas conditions, which comprise the steps of generating steam, condensing the steam in a heat exchanger and using the heat of condensation of the steam to heat a portion of high pressure gas in a controlled manner to maintain the required gas conditions of the lower pressure line throughout the range of operation, and passing the high pressure gas through a gas expander to drive an electrical generator. In one embodiment of the system, a portion of the gas fuel supplied to a steam generator is utilized as a motive gas supply for a gas ejector which creates a vacuum in the shaft sealing chamber of the gas expander, evacuates the leakage gas thereby preventing the release of gas to the surrounding, and combines evacuated gas with remainder of gas fuel for combustion in a steam generator.

3 Claims, 3 Drawing Sheets

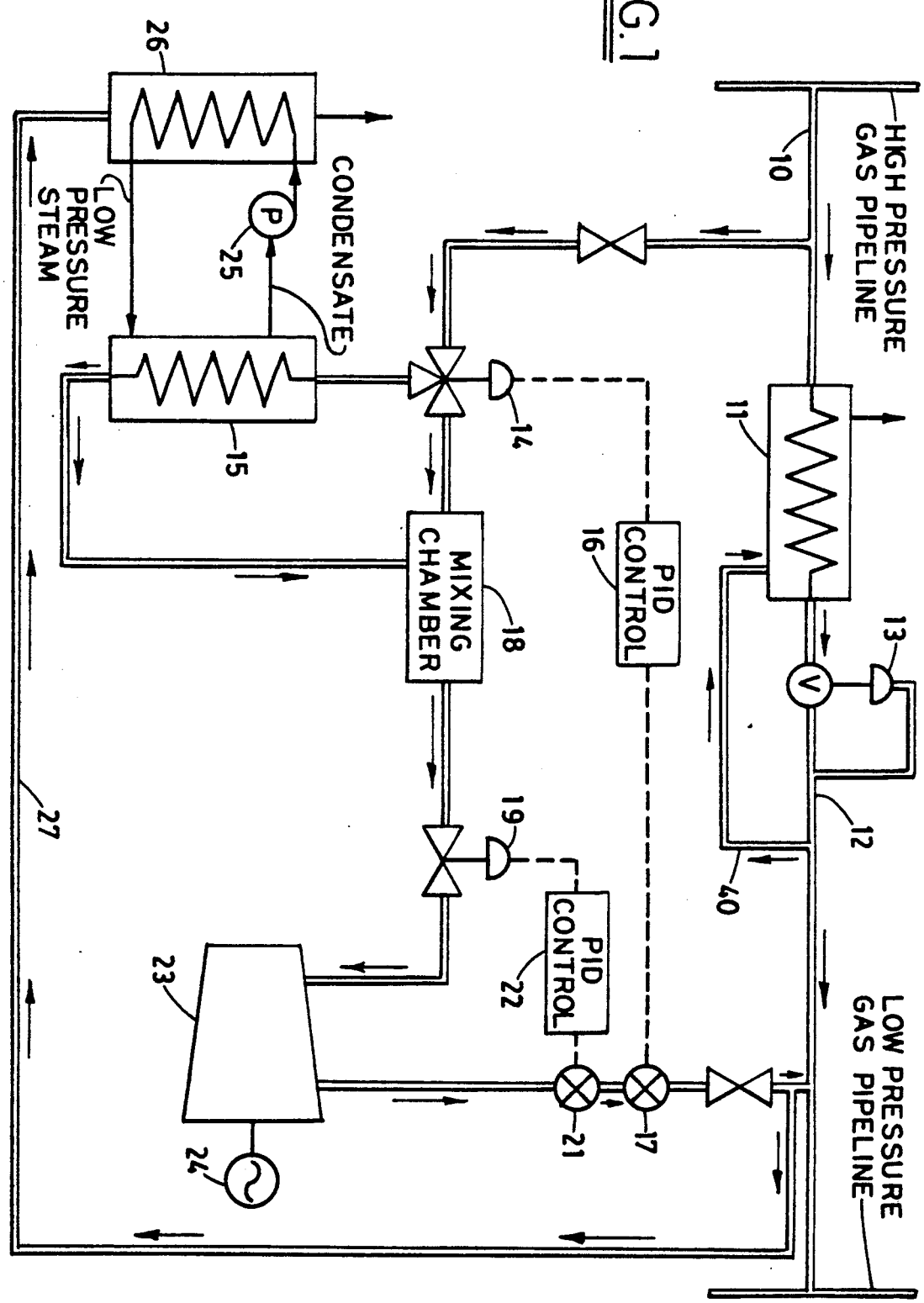

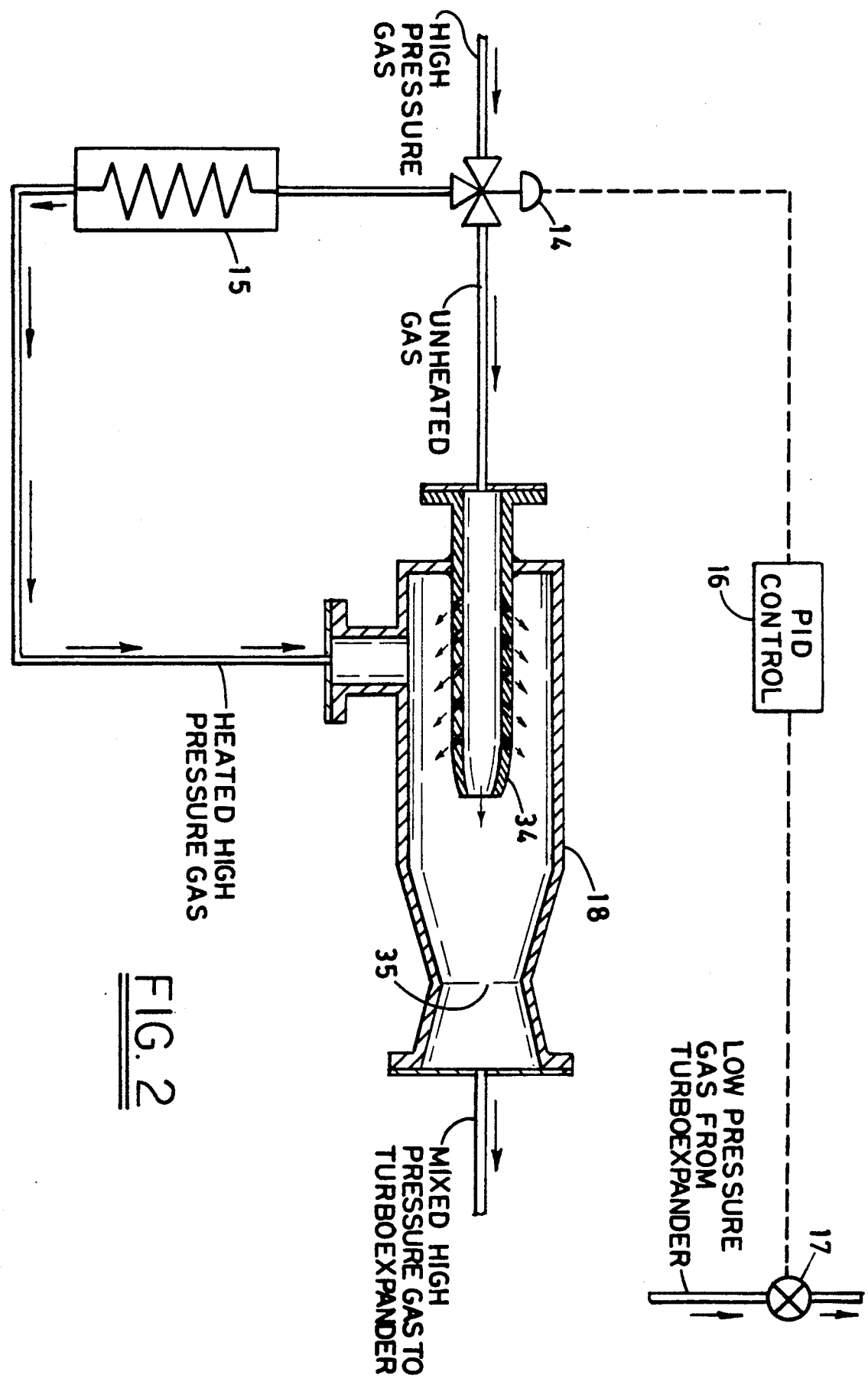

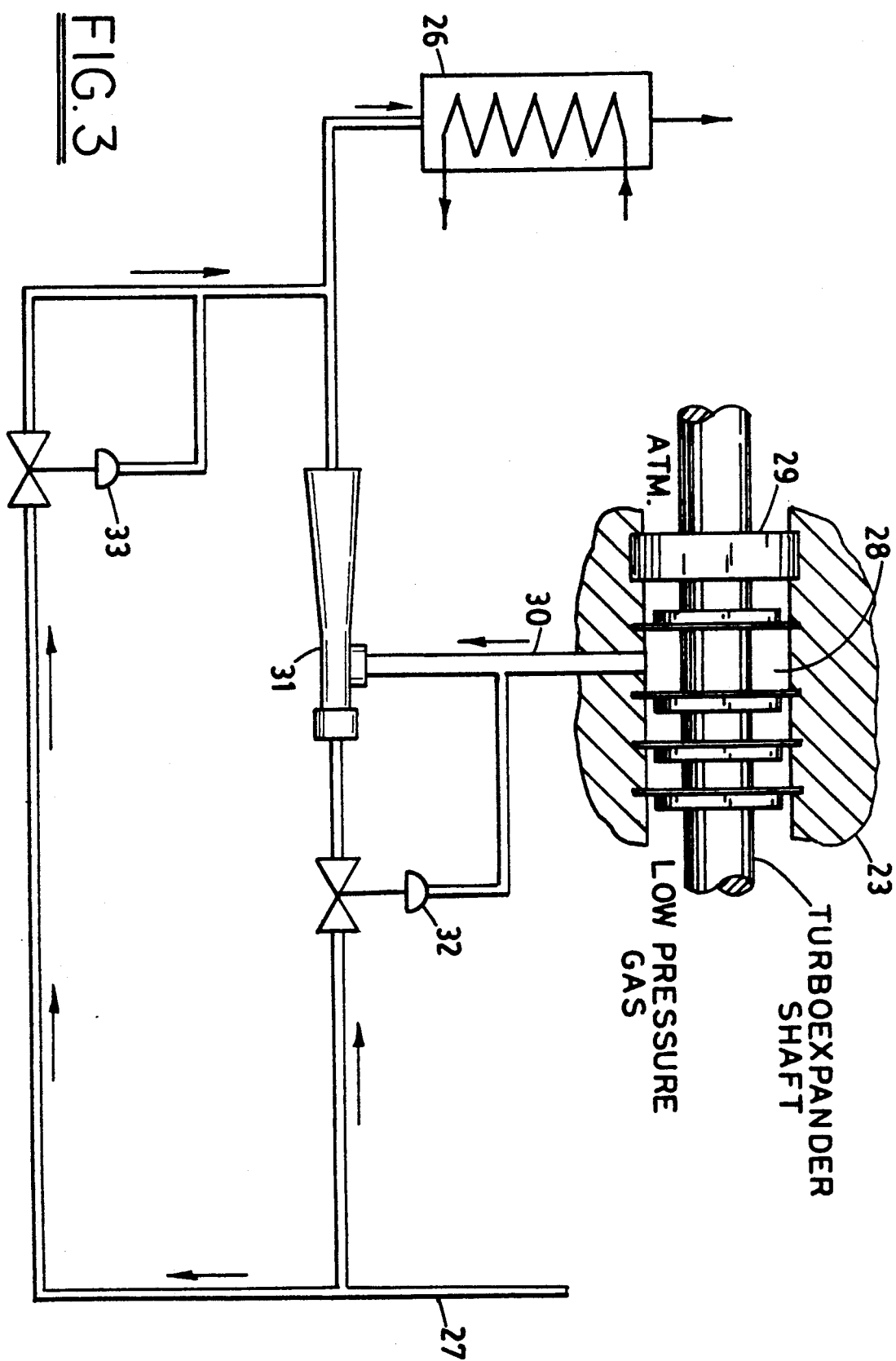

GAS EXPANDER BASED POWER PLANT SYSTEM

BACKGROUND OF THE INVENTION

This invention relates to power production process system with motive gas heated by externally applied heat and expanded through a turboexpander to drive electrical generator and produce electricity or to produce useful shaft power, through a method having condition response control and ways of accommodating fluctuating parameters and process requirements, and in particular, as it pertains to such plants operating at a pressure reducing station of a gas transmission line.

The terms "gas expander" and "turboexpander" as used in the description of this invention, are intended to mean apparatus for gas expansion and conversion of kinetic energy to rotational shaft power, and are meant to be interpreted as one and the same.

Prior to natural gas being delivered to a customer from a high pressure gas pipeline, its pressure is reduced through a throttling valve to meet the distribution and utilization requirements. This throttling process of pressure reduction causes a lowering of the gas temperature as it approaches a constant enthalpy process. Depending on the range of pressure reduction, it is often required to add heat to the gas prior to expansion in order to maintain suitable temperature of the gas at a lower pressure and prevent formation of hydrates. For a pressure reduction of 3 to 1 there is approximately 15–20° F. drop in temperature through a throttling valve. The gas is usually heated to an appropriate higher temperature by passing it through a hot water heat exchanger in which the water bath is heated by combustion of natural gas fuel, which due to the low throttling temperature drop and relatively uniform pressure reduction range is usually adequate.

When the gas is expanded through a turboexpander, the process approaches a constant entropy process which results in an isentropic temperature drop of about $120 \simeq 140°$ F. for a 3:1 pressure reduction with an actual design point temperature drop of about $70 \simeq 90°$ F. depending on isentropic efficiency of a turboexpander. The operation of the turboexpander at its design point produces maximum efficiency and minimum internal turboexpander throttling. The required temperature of the gas prior to expansion through a turboexpander is a function of the volume of gas entering, gas pressure upstream of expanding nozzles, gas exiting pressure or overall effective pressure ratio, turboexpander efficiency and the desired exit gas temperature. When the conditions of operation are variable with regard to the volume flow rate and/or entering gas pressure, and these conditions represent off-design point operation, then internal turboexpander throttling takes place prior to gas expansion through a nozzle, thereby reducing the effective pressure drop across an expanding nozzle and resulting in reduction of available energy for conersion to shaft power, lower process efficiency and higher exit gas temperature.

It is evident that increasing and maintaining the entering gas temperature to a fixed value determined by the requirements at the design point results in erratic exit gas temperature fluctuations at off-design points which result from variations of volume flow and pressure parameters.

Although a conventional gas heating process using water bath indirect heaters is adequate for simple throttling installations approaching constant enthalpy process, it is not considered a quick-acting temperature control system required for applications utilizing gas expanders which result in operation approaching a constant entropy process. Due to the greater effective temperature drop associated with use of gas expanders as means of pressure reduction and requirement for higher gas temperature prior to expansion than that of simple throttling, the conventional gas heating process previously described is considered to be inadequate. This is due to slow response characteristics of the water bath heater when heat transfer duty is varied and its limitations as to the maximum process gas temperature attainable.

SUMMARY OF THE INVENTION

The present invention provides a method and system for generating electricity or usable shaft power using a gas expander based power plant suitable for accommodating fluctuating parameters and process requirements and recovery of most of the energy that is normally lost when the gas pressure is reduced through a throttling valve from a high pressure gas transmission pipeline to a lower pressure gas distribution system. This is accomplished by reducing the pressure of the process gas with a gas expander and converting that energy to usable power with the overall power generating thermal efficiency as high as 83% when employing axial-flow gas expanders operating at moderate speed.

The invention also provides a system for controlling the applicable process parameters and precluding undesirable fluctuations and detrimental modes of operation. The method and apparatus which constitutes the system includes means of generating or supplying low pressure steam, heat exchangers which condense the steam and recover the heat of condensation given up by steam when it is condensed and transfer the heat to the portion of the process gas by raising its temperature to a higher than required temperature, and gas mixing equipment which combines the heated and unheated gas streams in proportion to controlled parameter requirement through a continuous control feed-back loop.

The invention further provides a system which precludes leakage of process gas from the gas expander shaft sealing chamber into surrounding atmosphere. This is accomplished by using a portion of the low pressure gas, supplied as fuel to the combustion apparatus of a steam generator, as a motive gas supply to the gas ejector. The gas ejector creates a vacuum in the shaft sealing chamber and leak-off lines of the turboexpander, provides positive evacuation of the leakage gas from said sealing chamber and precludes its release to the surrounding, thereby providing additional safety features.

These above features and advantages of the present invention will be apparent to those skilled in the art form a consideration of this specification including the attached drawings and appended claims.

BRIEF DESCRIPTION OF THE DRAWINGS

FIG. 1 is a schematic diagram of the embodiment of the gas expander based power plant for practicing the method of the invention. FIG. 2 is a schematic drawing of the exit gas temperature control system and process gas mixing apparatus for practicing the method of the invention.

FIG. 3 is a schematic diagram of the shaft gas leakage evacuation system for practicing the method of the invention.

DETAILED DESCRIPTION OF THE INVENTION

In the power generating plant of FIG. 1, a high pressure natural gas pipeline 10 is connected to a low pressure gas pipeline 12 through two parallel pressure reducing means. The first pressure reducing means includes a conventional throttling valve 13 and a water bath heater 11 with an integral process gas heat exchanger, which remains operational at all times and is supplied with natural gas fuel 40 from the low pressure pipeline 12. The parallel pressure reducing system includes heat exchanger 15, three-way temperature control mixing valve 14, proportional/integral/derivative (PID) temperature controller 16 and temperature transmitter 17 for sensing gas temperature of the lower pressure gas exiting the system, mixing chamber 18 which combines heated and unheated gas in proportion with controlled exit gas temperature setting, and gas expander 23 driving electrical generator 24. The gas expander 23 includes integral exit pressure control system consisting of pressure control valve 19 and proportional/integral/derivative (PID) exhaust pressure controller 22 receiving a signal from pressure transmitter 21 which senses gas pressure at the exit of the system to low pressure natural gas pipeline 12.

In the operation of the plant, it is contemplated that the pressure reduction process will be accomplished by passing all or portion of the gas through the gas expander 23 in order to obtain maximum possible power output and produce electricity, and the throttling valve 13 will be used to supplement the natural gas flow requirements at peak demand conditions or when for some reason the gas expander cannot be used. For this reason, the water bath heater 11 remains operational throughout the process to allow automatic proportioning of the flow between parallel pressure reducing means The low pressure line 12 may be the fuel line of a large power plant, an industrial plant or a local gas distribution system.

The remainder of the plant includes steam generator 26 and associated equipment including boiler feedwater pump 25, the steam generator being supplied with natural gas fuel 27 from the low pressure natural gas pipeline 12.

In operation, gas being delivered from the high pressure pipeline to the low pressure line is heated in indirect fired heater 11, providing such a heater is already utilized, to a temperature governed by simple throttling which approaches constant enthalpy process. Depending on the flow passing capacity of gas expander 23, a portion or all of the high pressure gas is bypassed around the indirect heater 11 and throttling valve 13 to a three-way mixing valve 14 which proportions gas flow to heat exchanger 15. The low pressure steam supplied by steam generator 26 is utilized as heat source in heat exchanger 15 where the heat of condensation is removed from the steam causing it to condense. At the same time, the heat of condensation of steam raises the temperature of the portion of the high pressure gas flow to the gas expander to a temperature in the range of 50–70° F. higher than the temperature required for pressure reduction by means of a gas expander. The unheated portion of the high pressure gas flow to the gas expander is bypassed around heat exchanger 15 from three-way mixing valve 14 and is combined with the heated portion of the gas flow from heat exchanger 15 in a mixing chamber 18. The combined gas stream flows through exit pressure control valve 19, located upstream or integral to the gas expander 23, which modulates the high pressure gas flow rate to the gas expander 23 where gas is expanded through pressure reduction to the low pressure gas pipeline 12. The expansion process produces shaft power output which is used to drive electric generator 24 and produce electricity. The shaft power output can also be utilized for mechanical drive applications.

The exit pressure control valve 19 receives a control signal from PID controller 22 sensing system exit gas pressure through pressure transmitter 21. The PID exhaust pressure controller 22 is set to maintain gas pressure in the low pressure gas pipeline 12 at about a 3–5% higher setting than the setting of the throttling valve 13. This will automatically cause the throttling valve 13 to modulate the gas flow passing through it such that if all of the flow demand to maintain set pressure in the low pressure pipeline 12 is satisfied by pressure reduction through the gas expander 23, throttling valve 13 will proceed to a fully closed position, while remaining operational. In the event the gas expander 23 is shutdown, the throttling valve 13 will sense a decrease in the pressure of the low pressure pipeline and will respond automatically to maintain its set pressure. When maximum gas flow capacity of the gas expander does not satisfy peak gas flow demand, both pressure reducing means will be operational such that pressure reduction through the gas expander 23 is maximized thereby producing greatest possible power output, and pressure reduction through throttling valve 13 is used to supplement and satisfy the demand flow requirements of the low pressure pipeline 12.

The steam generator 26 combustion apparatus receives gas fuel 27 from the low pressure pipeline 12. Condensate from heat exchanger 15 is returned to the suction side of the boiler feedwater pump 25 and is circulated in the steam generator where hot combustion products transfer its heat to the feedwater and generate low pressure steam for utilization in heat exchanger 15.

FIG. 2 embodies the apparatus required to obtain continuous and fast-acting control of the gas temperature exiting gas expander 23 into low pressure pipeline 12 such that same temperature is maintained in the system whether or not the gas expander is operational. This is often a basic requirement in any subsequent metering within the local distribution system or as it applies to requirements for optimum utilization conditions and efficiencies with regard to combustion equipment in large power and industrial plants. In operation, the temperature control system modulates the entrance gas temperature to the gas expander 23 to accommodate variations in available energy for conversion to power and gas expander efficiency, due to off-design conditions of varying entrance pressure and volume flow rate, by monitoring exit gas temperature.

The above design provides a fast-acting response control system which utilizes a three-way proportioning mixing valve 14 upstream of heat exchanger 15. The low pressure gas temperature exiting turboexpander is sensed by temperature transmitter 17 which provides continuous monitoring signal to PID temperature controller 16. The signal received is compared to the setting and necessary corrections are made through three-way mixing valve 14 by modulating the proportion of gas flow to heat exchanger 15 and the unheated gas flow to the mixing chamber 18. The temperature of the high pressure gas passing through heat exchanger 15 is elevated to a higher than normally required temperature such that the mixing process is effective. The mixing chamber 18 receives the heated high pressure gas from heat exchanger 15 through an opening located on the radial circumference of mixing chamber 18. The unheated high pressure gas enters the mixing chamber 18 axially through inner cylinder 34 which is provided with radial openings as means of interface between the heated and unheated high pressure gas streams. In the annulus created by circumferential surface of mixing chamber 18 and inner cylinder 34, gas streams are mixed by inducing moderate turbulence within said annulus as a result of unheated gas passing through radial openings of inner cylinder 34 The mixing chamber 18 extends into a flow recovery region where turbulence is diminished and pressure is stabilized as it passes through a large diameter, smooth veturi-type outlet opening 35 and into inlet piping of the gas expander 23.

The construction and functional details of the mixing chamber 18 as shown in FIG. 2 and described above constitute one embodiment of the apparatus suitable for utilization as an integral part of the exit gas temperature control system.

FIG. 3 illustrates the embodiment of a gas expander shaft sealing detail and leakage evacuation system where the portion of natural has from the low pressure pipeline 12 provided as gas fuel supply 27 to the steam generator 26 is utilized as a motive force supply to the gas ejector 31 The gas ejector creates a vacuum in the shaft sealing chamber 28, which is an integral part of turboexpander 23, and its leak-off line 30, and thereby provides positive evacuation of gas leakage in a manner that prevents release of gas leakage to the surrounding atmosphere. The gas leakage being evacuated by the system takes place along the turboexpander shaft between process gas region and atmosphere. Gas ejector control valve 32 is set to modulate motive supply gas through gas ejector 31 by sensing and controlling the vacuum created in the leak-off line 30 through use of said gas ejector. The turboexpander 23 shaft sealing casing is equipped with an outermost air-sealing device 29 which prevents excessive entrainment of ambient air into the system. Additional gas fuel for the steam generator 26 is bypassed around the gas ejector 31 through gas fuel pressure control valve 33 which senses and controls gas pressure downstream of gas ejector 31 as well as pressure of fuel supply to the steam generator 26, and is mixed with the gas discharged from the gas ejector 31.

This system is applicable to the use of steam generators which utilize low fuel pressure combustors, as gas ejector operation at high discharge pressure is often not feasible. If and when a separate supply of low pressure steam used as heat source in heat exchanger 15 is obtained from a remote source, such as low pressure waste steam line, then conventional mechanical seals will be utilized for shaft sealing of gas expander 23 to prevent and minimize shaft gas leakage to the atmosphere.

EXAMPLE OF POWER PLANT PERFORMANCE CHARACTERISTICS

An example of the thermal efficiency that can be obtained by operating a low to medium speed axial-flow gas expander based power plant using the methods of this invention are set forth below.

Assume that the high pressure gas temperature before being heated in heat exchanger 15 is 60° F. with the following applicable conditions:

| | |
|---|---|
| Gas specific gravity SG | 0.6158 |
| Gas specific heat Cp | 0.4908 BTU/lb-deg R |
| Gas constant k = Cp/Cv | 1.2555 |
| Inlet gas pressure | 765 psia |
| Outlet gas pressure | 70 psia |
| Inlet gas flow | 2.0 × 10$^6$ SCFH (94,265 lb/HR) |

For the purposes of this illustration, it can be shown through calculation methods that required gas expander inlet temperature for a subject axial-flow gas expander operating at 5000 rpm with overall expander efficiency of 64%, including expander mechanical losses, is 225° F. in order to maintain 60° F. outlet gas temperature to the low pressure pipeline 12.

Using the average specific heat of natural gas for the range between 60° F. and 225° F, it can be shown that heat exchanger duty is 8.066×10$^6$ BTU/HR. Assuming 98.5% reduction gear efficiency and 96.5% electric generator efficiency the power output is calculated to be 2350 KW with a resultant heat rate of 3432 BTU/KW-HR. Assuming steam generator 26 efficiency of 84.5% and accounting for pumping and fan motor requirement of 20 KW, it can be shown that fuel requirement is 9.546×10$^6$ BTU/HR with a resultant overall thermal efficiency of subject plant being:

$$\eta_{th} = \frac{(2350 - 20) \times 3411}{9.546 \times 10^6} = 83.3\%$$

Similar results are obtainable by applying the methods of this invention to high-speed, i.e. 20,000–50,000 rpm, radial-flow turboexpanders which exhibit higher isentropic efficiencies, usually in the range of 78–80%, such that overall turboexpander efficiency including mechanical losses is in the range of 75–78%.

The high thermal efficiency of gas expander based power plant results from the energy extracted from the gas which would normally be wasted through a simple throttling process and which was imparted on the gas during compression by pipeline compressor stations to maintain pipeline transport pressure and offset friction losses. The heating of the gas prior to expansion through the gas expander is required due to larger temperature drop associated with such expansion which approaches a constant entropy process.

It will be seen from the foregoing that this invention is well adapted to attain all of the objects set forth hereinabove, together with other advantages which are inherent to the disclosed method and system.

What is claimed is:

1. A method for generating electricity where gas pressure from a high pressure gas transmission line is reduced with a gas expander system capable of operating with fluctuating high pressure gas conditions and maintaining required outlet gas conditions for delivery to a lower pressure gas distribution line, which comprises the steps of supplying a portion of the lower pressure gas to the combustion apparatus of a steam generator, heating feedwater in said steam generator and producing a low pressure steam, condensing the steam in a heat exchanger using the heat of condensation of the steam to heat a portion of high pressure gas in a heat exchanger, mixing the heated high pressure gas with unheated high pressure gas in proportion to controlled variable requirements, reducing the pressure of the combined high pressure gas by passing the gas through a gas expander which produces useful shaft power for driving an electrical generator or for mechanical drive applications.

2. The method of claim 1 in which a gas temperature control system maintains outlet gas conditions from the gas expander for delivery to a lower pressure gas distribution line, which comprises the steps of sensing gas temperature exiting the gas expander, evaluating corrective action required to accommodate fluctuations of high pressure gas conditions, proportioning the quantity of high pressure gas to be heated in a heat exchanger through a three-way mixing valve, combining the heated high pressure gas with unheated high pressure gas in a gas mixing chamber and supplying the combined high pressure gas to the gas expander.

3. The method of claim 1 in which a shaft sealing and gas leakage evacuation system prevents release to atmosphere of a lower pressure gas contained in the gas expander casing, where a portion of gas fuel supplied to a steam generator is used as a motive gas supply to a gas ejector which creates a vacuum in the shaft sealing chamber of the gas expander, provides positive evacuation of the leakage gas form the gas expander casing, and combines evacuated leakage gas with the remainder of the gas fuel supplied for combustion in a steam generator.

* * * * *